US005789067A

United States Patent [19]

Mizumachi et al.

[11] Patent Number: 5,789,067

[45] Date of Patent: Aug. 4, 1998

[54] TRANSFER TYPE IMAGE PROTECTING FILM AND METHOD OF PRODUCING THE SAME

[75] Inventors: Motohiro Mizumachi; Satoru Shinohara; Kenichi Saito, all of Miyagi, Japan

[73] Assignee: Sony Corporation, Tokyo, Japan

[21] Appl. No.: 896,073

[22] Filed: Jul. 17, 1997

Related U.S. Application Data

[63] Continuation of Ser. No. 615,780, Mar. 14, 1996, abandoned.

[30] Foreign Application Priority Data

Jun. 2, 1995 [JP] Japan .................................... 7-159972

[51] Int. Cl.[6] .............................. B41M 5/035; B32B 7/12

[52] U.S. Cl. .................. 428/195; 428/354; 428/355 AC; 428/913; 428/914; 503/227; 8/471

[58] Field of Search .................................... 428/195, 343, 428/354, 355 CP, 355 AC, 913, 914; 503/227; 8/471

[56] References Cited

U.S. PATENT DOCUMENTS

| | | | |
|---|---|---|---|
| 4,599,259 | 7/1986 | Kobayashi et al. | 428/480 X |
| 4,977,136 | 12/1990 | Fujiwara et al. | 503/227 |
| 5,527,759 | 6/1996 | Oshima et al. | 503/227 |

FOREIGN PATENT DOCUMENTS

| | | |
|---|---|---|
| WO8303080 | 9/1983 | Japan . |
| 62-214990 | 3/1986 | Japan . |
| WO91/01223 | 7/1989 | Japan . |
| 4142987 | 10/1990 | Japan . |

*Primary Examiner*—Daniel Zirker
*Attorney, Agent, or Firm*—Hill & Simpson

[57] ABSTRACT

The present invention proves a transfer type image protecting film having a base film, an ultraviolet absorbing layer formed on a surface of the base film, and a surface adhesive layer formed on the ultraviolet absorbing layer and containing no ultraviolet absorber. This image protecting film is capable of effectively protecting and image from ultraviolet rays. The present invention also provides a method of producing the same image protecting film.

18 Claims, 1 Drawing Sheet

TRANSFER TYPE IMAGE PROTECTING FILM AND METHOD OF PRODUCING THE SAME

This is a continuation of application Ser. No. 08/615,780, filed Mar. 14, 1996, now abandoned.

BACKGROUND OF THE INVENTION

1. Field of the Invention

The present invention relates to an image protecting film used as a transparent film to be laminated on an image formed on photographic paper so as to protect the surface of the image.

2. Related Background Art

Conventionally, a transparent film is laminated on an image formed on photographic paper, particularly, an image formed by a sublimation type heat-transfer system using a subliming or thermal diffusing dye, in order to protect the surface, prevent discoloration and impart sebum resistance thereto.

A method of laminating a transparent film has been proposed in which a laminated film having a substrate and a laminated layer comprising a thermoplastic resin and formed on the substrate is partly heated and pressed so that only the heated portion of the laminated layer can be transferred to photographic paper, i.e., a method using a transfer type image protecting film has been proposed (Japanese Patent Laid-Open Nos. 60-204397, 59-85793 and 59-76298). The use of such a transfer type image protecting film can prevent curling of photographic paper to which the transparent film is laminated, and improve the sebum resistance to the sebum of hands and the plasticizer resistance to the plasticizers contained in vinyl chloride products such as wallpaper, floor mats, tablecloths, etc.

In order to prevent discoloration of an image due to ultraviolet rays, an attempt has been made to contain an ultraviolet absorber in a laminated layer of such a transfer type image protecting film to be transferred onto the image.

However, some ultraviolet absorbers speed up discoloration of a dye if coexisting with the dye. When a laminated layer containing an ultraviolet absorber is transferred onto an image, and when the dye which forms the image and the ultraviolet absorber are transferred into the same layer or adjacent layers, there is the problem of promoting discoloration of the image. Therefore, when an ultraviolet absorber is contained in a laminated layer to be transferred onto an image, the types and amounts of ultraviolet absorbers which can be used are, of course, limited, thereby making impossible to impart the practically effective ability to absorb ultraviolet rays to the laminated layer.

SUMMARY OF THE INVENTION

The present invention has been achieved for solving the above problem, and an object of the present invention is to enable efficient protection of an image from ultraviolet rays when the image is protected by using a transfer type image protecting film.

In order to achieve the object, in accordance with an embodiment of the present invention, there is provided a transfer type image protecting film comprising a layer in a multi-layer structure to be transferred onto an image, wherein the layer comprises a layer (surface adhesive layer) which is directly contacts the image to be protected and which contains no ultraviolet absorber, and an ultraviolet absorbing layer which is provided separately from the surface adhesive layer and which contains an ultraviolet absorber.

In accordance with another embodiment of the present invention, there is provided a transfer type image protecting film further comprising a heat-resistant lubricating layer provided on a surface of a base film opposite to the surface on which the ultraviolet absorbing layer is formed.

In accordance with a further embodiment of the present invention, there is provided a method of producing a transfer type image protecting film comprising the steps of coating a coating comprising a thermoplastic resin composition containing an ultraviolet absorber on a surface of a base film, drying the coating to form an ultraviolet absorbing layer, coating a coating comprising a thermoplastic resin composition containing no ultraviolet absorber on the ultraviolet absorbing layer and drying the coating to form a surface adhesive layer.

BRIEF DESCRIPTION OF THE DRAWINGS

FIG. 2(*b*) is a sectional view a transfer type image protecting film which is formed in an ink ribbon.

DESCRIPTION OF THE PREFERRED EMBODIMENTS

Figure 1:
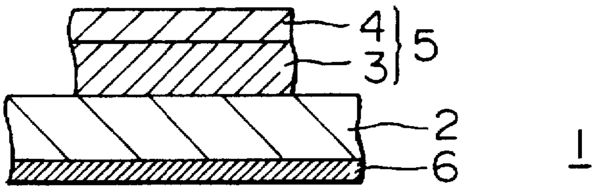
FIG. 1 is a sectional view of a transfer type image protecting film of the present invention.

The present invention is described in detail with reference to the drawings. In the drawings, the same reference numerals denote the same or equivalent components.

FIG. 1 is a sectional view of a transfer type image protecting film of the present invention. The image protecting film 1 shown in FIG. 1 has a laminated structure comprising an ultraviolet absorbing layer 3 and a surface adhesive layer 4 which are laminated in turn on a base film 2. When an image to be protected is protected by using this image protecting film 1, the ultraviolet absorbing layer 3 and the surface adhesive layer 4 are separated from the base film 2 and transferred onto the image to be protected to form an image protecting film 5. In this case, the surface adhesive layer 4 contacts directly the image to be protected.

In the present invention, the surface adhesive layer 4 is made of a thermoplastic resin containing no ultraviolet absorber. This can solve the problem of discoloration of an image due to the adverse effects of the ultraviolet absorber on the dye which forms the image to be protected.

Resins which effectively adhere to an image forming surface of photographic paper by heat transfer can appropriately be used as the thermoplastic resin which forms the surface adhesive layer 4. Examples of such resins include cellulose acetate butyrate resins, vinyl chloride-vinyl acetate copolymers, polyvinyl butyral resins, polyester resins and the like. Resins having good compatibility with a print receiving layer of the photographic paper on which an image to be protected is formed are preferably used. The use of such resins can improve the adhesion of the surface adhesive layer 4 to the photographic paper.

The thickness of the surface adhesive layer 4 can appropriately be determined in accordance with the type of the resin which forms the surface adhesive layer, the desired degree of adhesion, edge cutting (tailing) at the time of heat transfer, etc. However, the thickness is preferably about 1 to 10 μm from the viewpoint of transfer properties to the photographic paper.

On the other hand, the ultraviolet absorbing layer 3 is separated from the base film 2 and transferred onto the image to be protected by heat transfer so as to function to protect the image from ultraviolet rays, sebum and the plasticizer used. In the present invention, the ultraviolet absorbing layer 3 thus comprises the thermoplastic resin containing an ultraviolet absorber.

In the present invention, when the ultraviolet absorbing layer 3 is transferred onto the image to be protected, the ultraviolet absorbing layer 3 is laminated on the image through the surface adhesive layer 4, and thus it does not directly contacts the image. Therefore, the ultraviolet absorber contained in the ultraviolet absorbing layer 3 has no adverse effect on the dye which forms the image. Any desired ultraviolet absorbers which are suitable for imparting the desired ultraviolet absorption can be used as the ultraviolet absorber contained in the ultraviolet absorbing layer 3. Examples of such ultraviolet absorbers include benzophenone and benzotriazole ultraviolet absorbers and the like. The amount of the ultraviolet absorber used can be determined to be suitable for imparting the desired ultraviolet absorption.

The thermoplastic resin which forms the ultraviolet absorbing layer 3 preferably has excellent sebum resistance and plasticizer resistance, and is preferably incompatible or low compatible with the base film 2 so as to be easily separated from the base film 2 by heat transfer. Examples of such thermoplastic resins include cellulose acetate butyrate resins, vinyl chloride-vinyl acetate copolymers, polyvinyl butyral resins, acrylic resins and the like. Non-tacky resins having a glass transition point Tg of 40° C. or more, particularly, 60° C. or more, are particularly preferable. The use of such resins can achieve good touch, sebum resistance and plasticizer resistance.

It is also possible to add various additives to the ultraviolet absorbing layer 3 according to demand. For example, an antioxidant, a photostabilizer, an antistatic agent and a filler (silica or the like) can be added to the ultraviolet absorbing layer 3.

The thickness of the ultraviolet absorbing layer 3 can appropriately be determined in accordance with the type of the resin which forms the ultraviolet absorbing layer 3, the ultraviolet absorption to be imparted to the ultraviolet absorbing layer 3, and the degrees of sebum resistance and plasticizer resistance, and the handling properties of the film. However, the thickness is preferably about 1 to 10 μm from the viewpoint of the heat energy required for transfer.

The total thickness of the image protecting layer 5 comprising the ultraviolet absorbing layer 3 and the surface adhesive layer 4 is preferably about 1 to 10 μm.

The base film 2 is not limited as long as it has heat resistance which permits maintenance of the film shape at the temperature of heat transfer. Examples of such films which can be used include polyester films, polyimide films and the like.

The surface of the base film 2 which contacts the ultraviolet absorbing layer 3 may be subjected to release treatment using a silicone release agent, a fluorine release agent, an aliphatic acid ester release agent or the like so that the base film 2 and the ultraviolet absorbing layer 3 can easily be separated at the time of heat transfer.

On the other hand, heat-resistant lubrication treatment is performed or a heat-resistant lubricating layer 6 may be provided on the back of the base film 2 (the side of the base film 2 opposite to the ultraviolet absorbing layer 3). When the image protecting layer 5 comprising the ultraviolet absorbing layer 3 and the surface adhesive layer 4 is heat-transferred, by using a heat transfer printer, onto the image to be protected, therefore, it is possible to prevent fusing of the base film 2 with the thermal head of the printer, and ensure smooth running of the protecting film 1. The heat-resistant lubricating layer 6 can be made of, for example, a resin having a high softening point, such as acetate cellulose, epoxy resin or the like. A lubricant such as silicone oil, wax, aliphatic acid amide, a phosphate or the like may be coated on the resin layer or contained therein, or a filler may be contained in the resin layer.

Although the thickness of the base film 2 is not limited, the thickness is preferably about 3 to 20 μm.

The surface of the film 2 may be matted or smoothed, or may have any desired pattern formed thereon according to demand.

The method of producing the foregoing image protecting film 1 is not limited. For example, the image protecting film 1 may be produced by coating an ultraviolet absorbing layer forming coating comprising a thermoplastic resin composition containing an ultraviolet absorber on the base film 2, drying the coating to form the ultraviolet absorbing layer 3, coating an adhesive layer forming coating comprising a thermoplastic resin composition containing no ultraviolet absorber on the ultraviolet absorbing layer 3, and then drying the coating to form the surface adhesive layer 4.

Although the image protecting film of the present invention shown in FIG. 1 is described above, various modifications of the image protecting film of the present invention can be made. For example, a layer containing fluorescent brightener may be provided on the side of the ultraviolet absorbing layer 3 which contacts the surface adhesive layer 4 or the base film 2, in order to increase the whiteness of the image to be protected. An antistatic layer can also be formed between the base film 2 and the ultraviolet absorbing layer 3.

The image protecting layer of the present invention can also be realized as a portion of an ink ribbon. In heat transfer by a printer using an ink ribbon, therefore, the image protecting layer can be heat-transferred onto the image to be protected, by the thermal head of the printer used for forming the image.

Figure 2A:
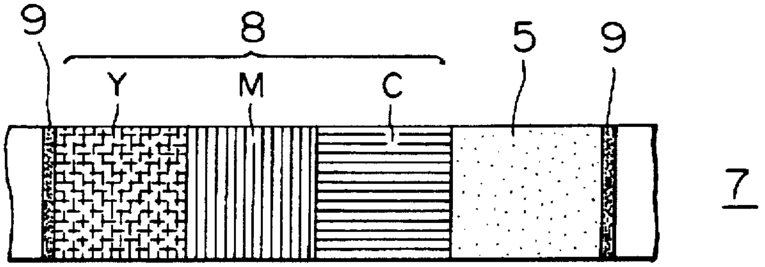
FIG. 2(*a*) is a plan view of a transfer type image protecting film which is formed in an ink ribbon.
Figure 2B:
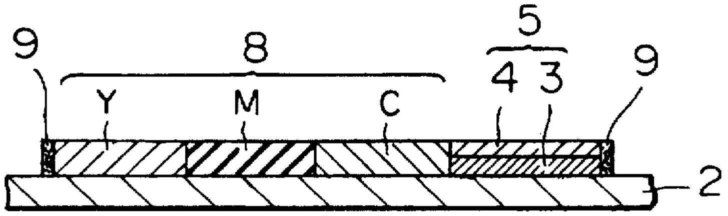

FIG. 2(*a*) is a plan view of an ink ribbon 7 which partly comprises the image protecting film of the present invention, and FIG. 2(*b*) is a sectional view of the same. In FIGS. 2, the ink ribbon 7 comprises yellow Y, magenta M and cyan C ink layers 8 and sensor marks 9, which are formed on a base film in order on the same plane, and an image protecting film 5 formed on the same plane as these layers.

The base film 2 can be formed in the same manner as the base film of the image protecting film 1 shown in FIG. 1. The image protecting layer 5 can also be formed in a laminated product comprising an ultraviolet absorbing layer 3 and a surface adhesive layer 4, as the image protecting layer of the above-described image protecting film.

The ink layers 8 can be formed for sublimation type heat transfer recording or heat melting type heat transfer recording according to demand, and can be formed in the same manner as ink layers of known ink ribbons. For example, when the ink layers 8 are formed for sublimation type heat transfer recording, the ink layers 8 can be formed by dissolving or dispersing subliming or heat diffusing dyes in a resin. Examples of such resins include cellulose resins such as methyl cellulose, ethyl cellulose, hydroxyethyl cellulose, hydroxypropyl cellulose, acetate cellulose and the like; vinyl resins such as polyvinyl alcohol, polyvinyl butyral, polyvinyl acetacetal, polyvinyl acetate, polystyrene and the like; various urethane resins.

Although FIGS. 2 show the case wherein the yellow Y, magenta M and cyan C ink layers are formed as the ink layers 8 in order on the same plane, an ink layer of black or the like may further be formed, or only a single ink layer having any desired color may be formed.

In the ink ribbon 7, a heat-resistant lubricating layer can also be formed on the back of the base film 2 according to demand, as in the above-described image protecting film 1.

In some cases of sublimation type heat transfer recording, a dye receiving layer is transferred to a material to be transferred from the ink ribbon before an image is transferred so that the image can be satisfactorily formed without the dye receiving layer formed on the material to be transferred. In order to transfer such a dye receiving layer, a heat transfer dye receiving layer may be formed on the same side of the ink ribbon as the ink layers. The dye receiving layer can be formed by using a thermoplastic resin having good dying property, such as polyester resin, cellulose ester resin, polycarbonate resin, polyvinyl chloride resin or the like.

In the transfer type image protecting film of the present invention, the image protecting layer to be heat-transferred onto the image to be protected has a multilayer structure comprising the layer (surface adhesive layer) which directly contacts the protected image and which contains no ultraviolet absorber, and the layer (ultraviolet absorbing layer) which does not contact directly with the protected image and which contains the ultraviolet absorber. After the image protecting layer is transferred onto the image to be protected, therefore, the ultraviolet absorber contained in the ultraviolet absorbing layer is physically cut off from the dye which forms the image to be protected, by the presence of the surface adhesive layer. The ultraviolet absorber thus causes no discoloration of the image due to the adverse effect on the dye which forms the image to be protected. It is thus possible to use any desired type of ultraviolet absorber in any desired amount, and effectively protect the image from ultraviolet rays.

The present invention is described in detail below with reference to examples.

EXAMPLE 1

The transfer type image protecting film shown in FIG. 1 was formed as follows.

A coating for forming an ultraviolet absorbing layer having the composition below was coated by using a wire bar on a PET film (thickness 6 μm) having the back which was subjected to heat-resistant lubrication treatment, so that the dry thickness was 3 μm, and then dried at 100° C. for 1 minute to form the ultraviolet absorbing layer. When preparing the coating for forming the ultraviolet absorbing layer, two types of cellulose acetate butyrate resins were combined for increasing viscosity and enhancing the film strength.

| [Coating for forming ultraviolet absorbing layer] | (parts by weight) |
|---|---|
| Cellulose acetate butyrate (CAB551-0.01, Eastman Chemical Co., Ltd.) | 10.0 |
| Cellulose acetate butyrate (CABB551-0.2, Eastman Chemical Co., Ltd.) | 10.0 |
| Ultraviolet absorber (SEESORB703, Cipro Kasei Co., Ltd.) | 1.0 |
| Methyl ethyl ketone | 39.5 |
| Toluene | 39.5 |

A coating for forming an adhesive layer having the composition below was prepared, and then coated on the ultraviolet absorbing layer so that the dry thickness was 3 μm, followed by drying at 100° C. for 1 minute to form the surface adhesive layer, to produce an image protecting film.

| [Coating for forming adhesive layer] | (parts by weight) |
|---|---|
| Cellulose acetate butyrate (CAB551-0.01, Eastman Chemical Co., Ltd.) | 20.0 |
| Methyl ethyl ketone | 40.0 |
| Toluene | 40.0 |

COMPARATIVE EXAMPLE 1

Figure 3:
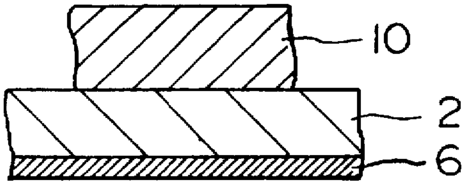
FIG. 3 is a sectional view of a transfer type image protecting film of a comparative example.

A transfer type image protecting film having an image protecting layer 10 which had the functions of both a surface adhesive layer and an ultraviolet absorbing layer and which was formed on a base film 2, as shown in FIG. 3, was formed as follows.

A coating for forming an image protecting layer having the composition below was coated, by using a wire bar, on a PET film having the back which was subjected to heat-resistant lubrication treatment as in Example 1 so that the dry thickness was 3 μm, and then dried at 100° C. for 1 minute to form the image protecting layer, to produce the image protecting film of the comparative example.

| [Coating for forming image protecting layer] | (parts by weight) |
|---|---|
| Cellulose acetate butyrate (CAB551-0.01, Eastman Chemical Co., Ltd.) | 20.0 |
| Ultraviolet absorber (SEESORB703, Cipro Kasei Co., Ltd.) | 1.0 |
| Methyl ethyl ketone | 39.5 |
| Toluene | 39.5 |

Evaluation

The image protecting layer of each of the image protecting films of Example 1 and Comparative Example 1 was heat-transferred onto an image formed on photographic paper.

In this case, the photographic paper used was formed by coating a composition for forming a dye receiving layer having the composition below on synthetic paper (thickness 150 μm, PFG-150, produced by Shin-Oji Seishi Co., Ltd.) using a wire bar so that the dry thickness was 6 μm, and then drying the coating. A gray image having density gradation was formed as an evaluation image on the photographic paper by a video printer (UP-D7000, produced by Sony Corporation) using videoprinter ink ribbon (UPC-7010, produced by Sony Corporation).

| [Composition for forming dye receiving layer] | (parts by weight) |
|---|---|
| Cellulose acetate butyrate (CAB551-0.2, Eastman Chemical Co., Ltd.) | 20.0 |
| Polyisocyanate (Takenate D-110N, Takeda Chemical Industries, Ltd.) | 0.6 |
| Silicone oil (SF-8427, Toray Dow Corning Silicone Co., Ltd.) | 1.0 |
| Plasticizer (Dicyclohexyl phthalate: Wako Junyaku) | 2.0 |
| Methyl ethyl ketone | 38.2 |
| Toluene | 38.2 |

In the method of transferring the image protecting layer of each of Example 1 and Comparative Example 1 on the evaluation image, the image protecting layer of the image protecting film of each of Example 1 and Comparative Example 1 was bonded to an ink portion of the ink ribbon, and transferred onto the evaluation image with energy for printing a solid image by using the video printer.

The light resistance of the evaluation image to which the image protecting layer of each of Example 1 and Comparative Example 1 was transferred was measured as follows. The evaluation image to which the image protecting layer was transferred was irradiated (amount of radiation 90000 $kJ/m^2$) by weatherometer (WEL-25AX, Suga Shikenki) using a xenon arc as a light source, and the density of the gradient portion of the evaluation image was measured by reflection densitometer (TR-924, produced by Macbeth Corp.) before and after irradiation. The light resistance (%) was determined according to the following equation.

Light resistance (%)=(density before irradiation/density after irradiation)×100

The results obtained are shown in Table 1.

TABLE 1

| | Light resistance (%) | | |
|---|---|---|---|
| Density before irradiation | 0.4 | 1.0 | 1.7 |
| Example 1 | 80% | 93% | 94% |
| Comparative Example 1 | 69% | 88% | 92% |

Table 1 indicates that, although the image protecting layers of Example 1 and Comparative Example 1 contain the same amount of ultraviolet absorber, the image protecting layer of Example 1 has excellent light resistance, as compared with Comparative Example 1.

What is claimed is:

1. An image protecting film for the thermal sublimation transfer over an image, the film comprising:
   - a base film,
   - an ultraviolet absorbing layer disposed on a top surface of the base film, the ultraviolet absorbing layer comprising an ultraviolet absorbing material suspended in a thermoplastic resin, the ultraviolet absorbing material being selected from the group consisting of benzophenone and benzotriazole, the thermoplastic resin being selected from the group consisting of cellulose acetate butyrate resins and polyvinyl butyral resins; and
   - a surface adhesive layer disposed on a top surface of the ultraviolet absorbing layer,
   - the surface adhesive layer comprising a resin selected from the group consisting of cellulose acetate butyrate resins and polyvinyl butyral resins, the surface adhesive layer being free of ultraviolet absorbing material.

2. The image protecting film of claim 1 wherein the surface adhesive layer has a thickness ranging from about 1 μm to about 10 μm.

3. The image protecting film of claim 1 wherein the ultraviolet adhesive layer has a thickness ranging from about 1 μm to about 10 μm.

4. The image protecting film of claim 1 further comprising a heat-resistant lubricating layer disposed on a bottom surface of the base film opposite to the top surface thereof on which the ultraviolet absorbing layer is disposed.

5. The image protecting film of claim 4 wherein the heat-resistant lubricating layer comprises a resin selected from the group consisting of acetate cellulose and epoxy resin.

6. The image protecting film of claim 4 further comprising a fluorescent brightener layer disposed on a top surface of the adhesive layer.

7. The image protecting film of claim 4 further comprising a fluorescent brightener layer disposed between the base film and the ultraviolet absorbing layer.

8. The image protecting film of claim 4 further comprising a fluorescent brightener layer disposed between the ultraviolet absorbing layer and the surface adhesive layer.

9. The image protecting film of claim 1 further comprising an antistatic layer disposed between the base film and the ultraviolet absorbing layer.

10. A method of producing an image protecting film for thermal sublimation transfer thereof over an image, the method comprising the following steps:
   - coating a base layer with an ultraviolet absorbing layer, the ultraviolet absorbing layer comprising a thermoplastic resin composition containing an ultraviolet absorber, the ultraviolet absorber being selected from the group consisting of benzophenone and benzotriazole, the thermoplastic resin being selected from the group consisting of cellulose acetate butyrate resins and polyvinyl butyral resins;
   - drying the ultraviolet absorbing layer; and
   - coating the ultraviolet absorbing layer with a surface adhesive layer, the surface adhesive layer comprising a thermoplastic resin selected from the group consisting of cellulose acetate butyrate resins and polyvinyl butyral resins, the surface adhesive layer being free of ultraviolet absorbing material.

11. The method of claim 10 wherein the surface adhesive layer has a thickness ranging from about 1 μm to about 10 μm.

12. The method of claim 10 wherein the ultraviolet adhesive layer has a thickness ranging from about 1 μm to about 10 μm.

13. The method of claim 10 further comprising the step of coating a surface of the base film disposed on an opposing side of the base film from the ultraviolet absorbing layer with a heat-resistant lubricating layer.

14. The method of claim 13 wherein the heat-resistant lubricating layer comprises a resin selected from the group consisting of acetate cellulose and epoxy resin.

15. The method of claim 10 further comprising the following step prior to the step of coating the base layer with an ultraviolet absorbing layer:
   - coating the base layer with a fluorescent brightener layer.

16. The method of claim 10 further comprising the following step after the step of drying the ultraviolet absorbing layer and prior to the step of coating the ultraviolet absorbing layer with a surface adhesive layer:
   - coating the ultraviolet absorbing layer with a fluorescent brightener layer.

17. The method of claim 10 further comprising the step of coating the surface adhesive layer with a fluorescent brightener layer.

18. The method of claim 10 further comprising the following step prior to the step of coating the base layer with the ultraviolet absorbing layer:
   - coating the base layer with an anti-static layer.

* * * * *